United States Patent
Pouli et al.

(10) Patent No.: US 10,572,983 B2
(45) Date of Patent: Feb. 25, 2020

(54) METHOD AND APPARATUS FOR INVERSE TONE MAPPING

(71) Applicant: THOMSON Licensing, Issy-les-Moulineaux (FR)

(72) Inventors: Tania Pouli, Le Rheu (FR); Jonathan Kervec, Paimpont (FR); Cedric Thebault, Chantepie (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 135 days.

(21) Appl. No.: 15/755,505

(22) PCT Filed: Aug. 25, 2016

(86) PCT No.: PCT/EP2016/070059
§ 371 (c)(1),
(2) Date: Feb. 26, 2018

(87) PCT Pub. No.: WO2017/036908
PCT Pub. Date: Mar. 9, 2017

(65) Prior Publication Data
US 2018/0253834 A1 Sep. 6, 2018

(30) Foreign Application Priority Data
Aug. 31, 2015 (EP) .................. 15306337.5

(51) Int. Cl.
*G06T 5/00* (2006.01)
*G06T 7/13* (2017.01)
(52) U.S. Cl.
CPC .............. *G06T 5/007* (2013.01); *G06T 5/008* (2013.01); *G06T 7/13* (2017.01); *G06T 2207/20208* (2013.01)

(58) Field of Classification Search
None
See application file for complete search history.

(56) References Cited

U.S. PATENT DOCUMENTS 4,855,811 A * 8/1989 Isnardi ................... H04N 11/30
348/434.1
4,967,263 A * 10/1990 Dieterich ............... H04N 11/24
348/628
(Continued)

FOREIGN PATENT DOCUMENTS

WO WO2015096955 7/2015
WO WO2015123067 8/2015

OTHER PUBLICATIONS

Banterle et al., "High Dynamic Range Imaging and Low Dynamic Range Expansion for Generating HDR Content", Computer Graphics Forum, vol. 28, No. 8, Dec. 2009, pp. 2343-2367.
(Continued)

*Primary Examiner* — Kevin Ky
(74) *Attorney, Agent, or Firm* — Brian J. Dorini; Patricia A. Verlangieri

(57) ABSTRACT

A method for inverse tone mapping is provided. The method comprising obtaining a digital image in a color space wherein the luminance is separate from the chrominance, determining a base luminance of pixels in the digital image, determining a detail enhancement map, determining a pixel expansion exponent map, determining an edge map of the image, inverse tone mapping luminance of image based on edge map, pixel expansion map and base luminance, and providing an expanded dynamic range image based on the inverse tone mapped luminance.

12 Claims, 5 Drawing Sheets

(56) References Cited

U.S. PATENT DOCUMENTS

| | | | |
|---|---|---|---|
| 5,343,254 A * | 8/1994 | Wada | H04N 5/202 348/252 |
| 8,314,847 B2 | 11/2012 | Brunner | |
| 2001/0046320 A1 * | 11/2001 | Nenonen | G06T 5/004 382/169 |
| 2005/0083120 A1 | 4/2005 | Roos et al. | |
| 2006/0181620 A1 * | 8/2006 | Kimbell | H04N 9/045 348/241 |
| 2006/0290950 A1 | 12/2006 | Platt et al. | |
| 2008/0018506 A1 * | 1/2008 | Raveendran | G06T 5/007 341/51 |
| 2008/0024513 A1 * | 1/2008 | Raveendran | G06T 5/007 345/589 |
| 2008/0166042 A1 * | 7/2008 | Pan | G06K 9/4652 382/164 |
| 2008/0166044 A1 * | 7/2008 | Pan | G06K 9/4652 382/167 |
| 2010/0002954 A1 * | 1/2010 | Lukac | G06T 3/4015 382/274 |
| 2010/0194773 A1 * | 8/2010 | Pan | G09G 5/02 345/590 |
| 2013/0177066 A1 | 7/2013 | Ye et al. | |
| 2014/0210847 A1 | 7/2014 | Knibbeler et al. | |

OTHER PUBLICATIONS

Meylan et al., "Tone Mapping for High Dynamic Range Displays", IS&T/SPIE Electronic Imaging: Human Vision and Electronic Imaging XII, San Jose, California, USA, Jan. 2007, pp. 1-12.

* cited by examiner

METHOD AND APPARATUS FOR INVERSE TONE MAPPING

This application claims the benefit of International Application PCT/EP2016/070059, under 35 U.S.C. § 365, filed on Aug. 25, 2016, which was published in accordance with Article 21(2) on Mar. 9, 2017, in English, and which claims the benefit of European Patent Application No. 15306337.5, filed on Aug. 31, 2015.

TECHNICAL FIELD

This disclosure pertains to the field of tone management and specifically the problem of expanding the luminance of images to match the dynamic range of high dynamic range (HDR) displays. The disclosure specifically proposes a method for reducing noise in the image as part of the expansion process.

BACKGROUND ART

Recent advancements in display technology are beginning to allow for an extended range of color, luminance and contrast to be displayed. Technologies allowing for extensions in luminance or brightness range of image content are known as high dynamic range imaging, often shortened to HDR. HDR technologies focus on capturing, processing and displaying content of a wider dynamic range.

Although a number of HDR display devices have appeared, and image cameras capable of capturing images with an increased dynamic range are being developed, there is still very limited HDR content available. While recent developments promise native capture of HDR content in the near future, they do not address existing content.

To prepare conventional (hereon referred to as LDR for low dynamic range) content for HDR display devices, reverse or inverse tone mapping operators (ITMO) can be employed. Such algorithms process the luminance information of colors in the image content with the aim of recovering or recreating the appearance of the original scene. Typically, ITMOs take a conventional (i.e. LDR) image as input, expand the luminance range of the colors of this image in a global manner, and subsequently process highlights or bright regions locally to enhance the HDR appearance of colors in the image.

Although several ITMO solutions exist, they focus at perceptually reproducing the appearance of the original scene and rely on strict assumptions about the content. Additionally, most expansion methods proposed in the literature are optimized towards extreme increases in dynamic range.

Typically, HDR imaging is defined by an extension in dynamic range between dark and bright values of luminance of colors combined with an increase in the number of quantization steps. To achieve more extreme increases in dynamic range, many methods combine a global expansion with local processing steps that enhance the appearance of highlights and other bright regions of images. Known global expansion steps proposed in the literature vary from inverse sigmoid, to linear or piecewise linear.

To enhance bright local features in an image, it is known to create a luminance expansion map, wherein each pixel of the image is associated with an expansion value to apply to the luminance of this pixel using some function.

The luminance expansion step increases the contrast in the image so that it is better suited for HDR displays. However often, at the same time, this step increases the contrast of artifacts or noise in the image, making such artifacts more visible and therefore more disturbing to the viewers. For that purpose, it might be desirable to denoise the image. If an existing denoising process is applied before or after the ITMO as a separate process, many additional computations will be required.

This disclosure is closely related to published application WO2015096955, filed 2 Dec. 2014, entitled "METHOD FOR INVERSE TONE MAPPING AN IMAGE" which is incorporated by reference. In comparison with this document, this invention mainly adapts the expansion process in order to reduce noise in the image in a computationally efficient manner, minimizing additional processing.

SUMMARY OF INVENTION

The present disclosure is directed to techniques to expand or reshape the luminance information using components that are already present in the core algorithm described in WO2015096955 but in a way that reduces noise in the image, without requiring too many new processing steps.

A subject of the invention is a method for providing an expanded dynamic range image from a digital image defined by pixels associated with colors represented in a color space separating luminance from chrominance, comprising:

inverse tone mapping luminance value of pixels of said image, and, providing an expanded dynamic range image based on the inverse tone mapped luminance values, wherein the inverse tone mapping luminance value of at least one pixel is based on an information representative of edges and/or gradients around said at least one pixel in the digital image.

It means that the luminance of this at least one pixel is inverse tone mapped depending on the neighboring content around this at least one pixel in the image.

Preferably, said information $M(p)$ representative of edges and/or gradients around said at least one pixel is obtained by the application of an edge detector algorithm to pixels surrounding said at least one pixel.

Preferably, these surrounding pixels are defined as belonging to a block centered on said at least one pixel.

Preferably, said edge detector algorithm is applied to a low pass filtered luminance value of said surrounding pixels.

Preferably, said inverse tone mapping of pixels comprises applying an expansion exponent value $E(p)$ of said pixels to the luminance value $Y(p)$ of said pixels.

Preferably, the inverse tone mapping of the at least one pixel which is based on an information representative of edges and/or gradients around this at least one pixel comprise applying an expansion exponent value of said at least one pixel to a weighted combination of a low-pass filtered luminance and of the luminance of said at least one pixel, in which the weight assigned to said low-pass filtered luminance is proportional to a value representative of edges and/or gradients around said at least one pixel, in which the weight assigned to said luminance is inversely proportional to said value representative of edges and/or gradients around said at least one pixel.

Preferably, said weighted combination is a weighted sum.

Preferably, the value representative of edges and/or gradients around said at least one pixel is above or equal a threshold T.

Preferably, the method comprises combining inverse tone mapped luminance values of said pixels with scaled chrominance values of said pixels.

A subject of the invention is also an apparatus for providing an expanded dynamic range image from a digital image defined by pixels associated with colors represented in a color space separating luminance from chrominance, comprising a processing unit configured to implement the above method. This processing unit comprises one or several processors.

A subject of the invention is also a non-transitory computer-readable medium storing computer-executable instructions executable to perform the above method.

In one embodiment, a method for inverse tone mapping is provided. The method comprises obtaining a digital image in a color space wherein the luminance is separate from the chrominance, determining a base luminance of pixels in the digital image, determining a detail enhancement map, determining a pixel expansion exponent map, determining an edge map of the image, inverse tone mapping luminance of image based on edge map, pixel expansion map and base luminance, and providing an expanded dynamic range image based on the inverse tone mapped luminance.

Preferably, the base luminance is determined by low-pass filtering the luminance of pixels in the digital image.

Preferably, the inverse tone mapping is based on a threshold value for the edge map.

Preferably, providing an expanded dynamic range image further comprises combining the inverse tone mapped luminance with scaled chrominance.

In another embodiment, an apparatus for inverse tone mapping is provided. The apparatus comprises a storage, memory and processor. The storage is for storing video content. The memory for storing data for processing. The processor is in communication with the storage and memory. The processor is configured to obtain a digital image in a color space wherein the luminance is separate from the chrominance, determine a base luminance of pixels in the digital image, determine a detail enhancement map, determine a pixel expansion exponent map, determine an edge map of the image, inverse tone map luminance of digital image based on edge map, pixel expansion map and base luminance, and provide an expanded dynamic range image based on the inverse tone mapped luminance.

In another embodiment, a non-transitory computer-readable medium storing computer executable instructions is provided. The instructions are executable to perform a method comprising obtaining a digital image in a color space wherein the luminance is separate from the chrominance, determining a base luminance of pixels in the digital image, determining a detail enhancement map, determining a pixel expansion exponent map, determining an edge map of the image, inverse tone mapping luminance of image based on edge map, pixel expansion map and base luminance, and providing an expanded dynamic range image based on the inverse tone mapped luminance.

BRIEF DESCRIPTION OF DRAWINGS

The invention will be more clearly understood on reading the description which follows, given by way of non-limiting example and with reference to the appended figures in which.

DESCRIPTION OF EMBODIMENTS

The functions of the various elements shown in the figures may be provided through the use of dedicated hardware as well as hardware capable of executing software in association with appropriate software.

Figure 1:
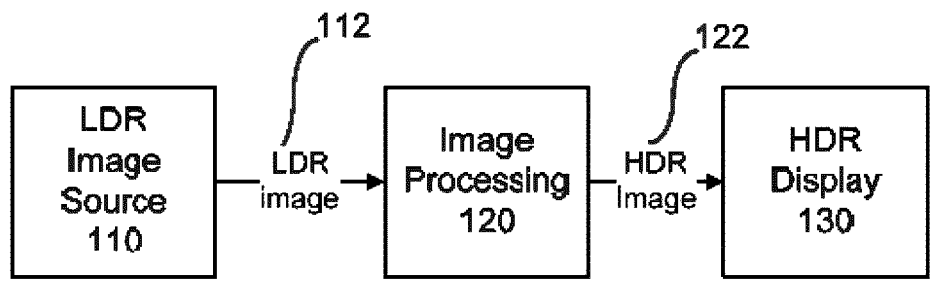
FIG. 1 depicts a block schematic diagram of a system in which inverse tone mapping with noise reduction can be implemented according to an embodiment.

Turning now to FIG. 1, a block diagram of an embodiment of a system 100 for implementing noise reduction in inverse tone mapping in view of this disclosure is depicted. The system 100 includes an image source 110, image processing 120, and a display 130. Each of these will be discussed in more detail below.

The image source 110 may be a broadcast source, camera, server, or other storage device such as a hard drive, flash storage, magnetic tape, optical disc, or the like. The images source 110 provides low dynamic range (LDR) content, such as a digital image 112, to image processing 120. The digital images 112 may be in any number of formats and resolutions.

The content processing 120 is where the digital images are converted from low dynamic range (LDR) to High Dynamic Range (HDR). This involves the inverse tone mapping operators (ITMO) including noise reduction as set forth herein. The image processing 120 outputs an HDR image 122 to the display 130.

The display 130 can be a television, personal electronic device, or the like that is capable of displaying High Dynamic Range (HDR) images provided by the content processing 120.

Figure 2:
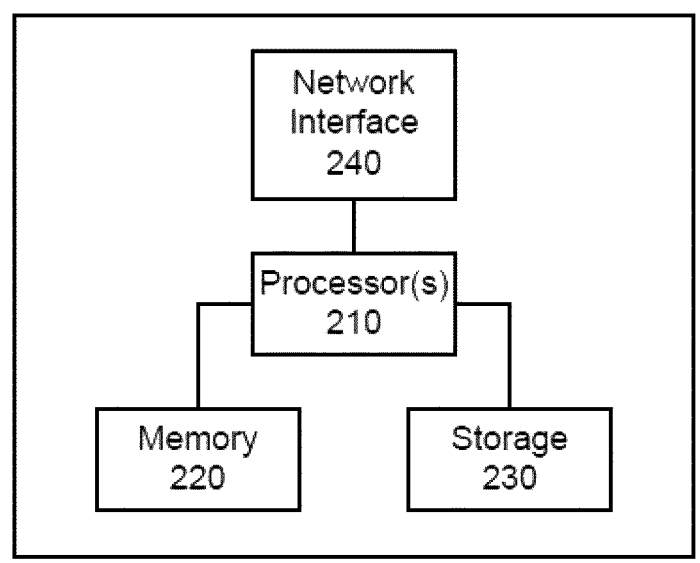
FIG. 2 depicts a block schematic diagram of an electronic device for implementing the methodology of inverse tone mapping with noise reduction according to an embodiment.

FIG. 2 depicts an exemplary electronic device 200 that can be used to implement the methodology and system for inverse tone mapping with noise reduction. The electronic device 200 includes one or more processors 210, memory 220, storage 230, and a network interface 240. Each of these elements will be discussed in more detail below.

The processor 210 controls the operation of the electronic device 200. The processor 210 runs the software that operates the electronic device as well as provides the functionality for LDR to HDR conversion set forth in the present disclosure. The processor 210 is connected to memory 220, storage 230, and network interface 240, and handles the transfer and processing of information between these elements. The processor 210 can be general processor or a processor dedicated for a specific functionality. In certain embodiments there can be multiple processors.

The memory 220 is where the instructions and data to be executed by the processor are stored. The memory 220 can include volatile memory (RAM), non-volatile memory (EEPROM), or other suitable media.

The storage 230 is where the data used and produced by the processor in executing the content analysis is stored. The storage may be magnetic media (hard drive), optical media (CD/DVD-Rom), or flash based storage. Other types of suitable storage will be apparent to one skilled in the art given the benefit of this disclosure.

The network interface 240 handles the communication of the electronic device 200 with other devices over a network. Examples of suitable networks include Ethernet networks, Wi-Fi enabled networks, cellular networks, and the like. Other types of suitable networks will be apparent to one skilled in the art given the benefit of the present disclosure.

It should be understood that the elements set forth in FIG. 2 are illustrative. The electronic device 200 can include any number of elements and certain elements can provide part or all of the functionality of other elements. Other possible implementation will be apparent to on skilled in the art given the benefit of the present disclosure.

It is to be understood that the invention may be implemented in various forms of hardware, software, firmware, special purpose processors, or combinations thereof. The term "processor" should not be construed to refer exclusively to hardware capable of executing software, and may implicitly include, without limitation, digital signal processor ("DSP") hardware, read-only memory ("ROM") for storing software, random access memory ("RAM"), and non-volatile storage. The disclosed concepts may be notably implemented as a combination of hardware and software. Moreover, the software may be implemented as an application program tangibly embodied on a program storage unit. Such a software can take the form of a plug-in to be integrated to another software. The application program may be uploaded to, and executed by, an image processing device comprising any suitable architecture. Preferably, the image processing device is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit, a display device, a printing unit, . . . . The image processing device implementing the embodiment of the method according to the invention may be part of any electronic device able to receive images, for instance a TV set, a set-top-box, a gateway, a cell phone, a tablet.

Figure 3:
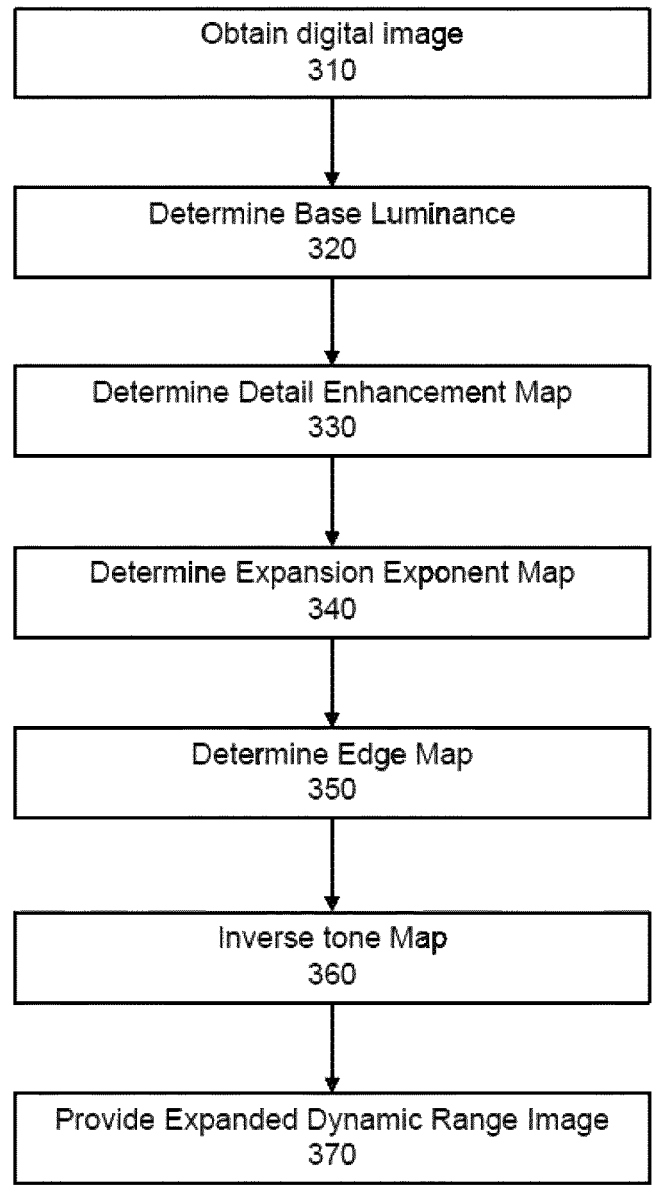
FIG. 3 depicts an exemplary flowchart of a methodology for inverse tone mapping with noise reduction according to an embodiment.

FIG. 3 depict a flow diagram 300 of a process for noise reduction for inverse tone mapping in accordance with one embodiment. The flow diagram 300 includes the stages of: obtaining a digital image 310, determining a base luminance 320, determining a detail enhancement map 330, determining a pixel expansion map 340, determining an edge map 350, inverse tone mapping 360, and providing an expanded dynamic range image 370. Each of these steps will be discussed in more detail below in combination with FIG. 4.

Figure 4:
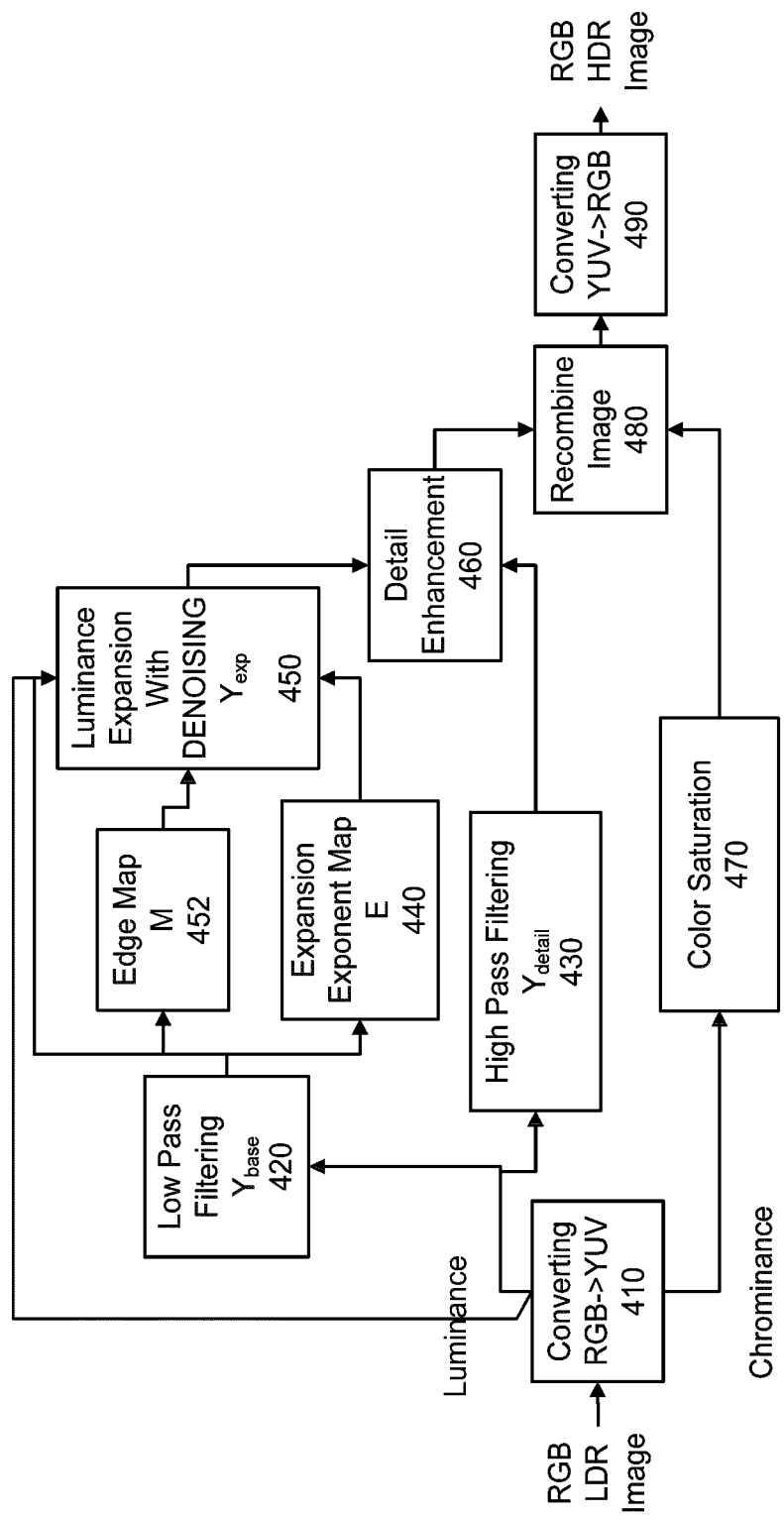
FIG. 4 depicts a block schematic diagram of modules for implementing the methodology of inverse tone mapping with noise reduction according to an embodiment.

FIG. 4 depicts a block diagram 400 of the modules used to perform the low dynamic range to high dynamic range conversion using the noise reduction expansion for inverse tone mapping operators of the present disclosure. These modules include RGB->YUV conversion module 410, low pass filtering module 420, high pass filtering module 430, expansion mapping module 440, edge mapping module 452, inverse tone mapping module 450, detail enhancement module 460, color saturation module 470, image recombination module 480, and RGB conversion module 490.

Referring back to FIG. 3, a digital image 112 is obtained (310) from an image source 110 as discussed above. The techniques of the present disclosure require that the digital image 112 be in a color space where the luminance is separate from the chrominance. If the digital image 112 is not in such a color space, then it can be converted to such a color space.

For example, the digital image 112 could be provided in a RGB color space of a display device. This RGB color space can be standardized, and the corresponding display device can be a virtual one. In such a case, the received RGB color coordinates representing colors of the digital image 112 are converted to a color space separating luminance from chrominance, for instance the YUV color space. This conversion of colors from the RGB color space into the YUV color space is known per se and therefore not described in detail. Any other color space separating luminance from chrominance can be used instead, as XYZ, Yxy, CIE Lab. Therefore, a luminance value Y(p) and two chrominance values U(p), V(p) are associated with the color of any pixel p of the digital image 112. This functionality is provided by the RGB->YUV conversion module 410 of FIG. 4.

Using the low pass filtering module 420, a low-pass filtered version of luminance Y(p) is determine referred to herein as a base luminance, $Y_{base}(p)$ (stage 320 of FIG. 3), For example, low-pass filtering can be applied to luminance Y(p) of each pixel, p, of original LDR digital image 112 based on one or more Gaussian functions in a spatial neighborhood of the pixel p, and in a neighborhood of the luminance value Y(p). For example, $Y_{base}(p)$ can be determined through the following equation:

$$Y_{base}(p) = \Sigma_{i \in \Omega'} Y(p_i) f'_s(\|p_i - p\|) f'_r(\|Y(p_i) - Y(p)\|) \quad (1)$$

where $f'_s$ is first a Gaussian function applied on the spatial domain of the image, $f'_r$ a second Gaussian function applied on the luminance range domain, $\Omega'$ is the size of a window of the image centered at the pixel p, and $p_i$ is a pixel in this window.

In various embodiments, the window size can be for instance 5 or 7. Smaller values of window size may allow for better computational efficiency. In this example, the low-pass filtering is bilateral, which refers to the fact that the filtering is performed here both in spatial and luminance range domains.

In various embodiments, the value of the standard deviation, $\sigma_s$, of the first Gaussian function $f'_s$ can be greater than or equal to 2. In various embodiments, the value of the standard deviation, $\sigma_r$, of the second Gaussian function $f'_r$ can be high enough to smooth texture and noise in the original LDR image 112, but low enough to avoid crossing edges between objects of the image. In various embodiments, the value of the standard deviation, $\sigma_r$, can be between 0.1 max(Y) and 0.5 max(Y), where max(Y) is the maximum luminance value over all pixels of the original image. In various embodiments, the standard deviation for the spatial Gaussian function $f'_s$ can be set at $\sigma_s = 3$, and the standard deviation for the luminance range Gaussian function $f'_r$ can be set at $\sigma_r = 0.3 \times \max(Y)$.

The determined base luminance (stage 320 of FIG. 3), $Y_{base}(p)$, can be provided to high pass filtering module 430. $Y_{base}(p)$ can also be provided to expansion mapping module 440. Both modules are described in more detail below.

The high pass filtering module 430 is configured to extract high frequency details in the digital image 112 from base luminance $Y_{base}(p)$ and/or luminance Y(p) such as to determine a luminance detail enhancement map, $Y_{detail}(p)$, based on $Y_{base}(p)$ and Y(p) (Stage 330 of FIG. 3).

For example, in various embodiments $Y_{detail}(p)$ can be determined by first determining:

$$Y'_{base}(p)=\Sigma_{i\in\Omega''}Y(p_i)f''_s(\|p_i-p\|)f''_r(\|Y(p_i)-y(p)\|)$$

where $f''_s$ and $f''_r$ are the same Gaussian functions as above ($f'_s$, $f'_r$), but with larger standard deviation in the luminance range in order to remove more luminance details in the image, $\Omega''$ is the size of a window of the image centered at the pixel, p, which can have the same size as above, and $p_i$ is a pixel in this window.

$Y'_{base}(p)$ can be determined by filtering $Y(p)$ in a similar way that $Y_{base}(p)$ is determined, but with parameters that remove more luminance details. For example, in various embodiments the standard deviation for the spatial Gaussian function $f''_s$ can be set such that $\sigma''_s=\sigma'_s$, and the standard deviation for the luminance range Gaussian function $f''_r$ can be set such as to remove more luminance details in the image, i.e., such that $\sigma''_r>\sigma'_r$. For instance $\sigma''_r$ can be set equal to $0.3\times max(Y)$.

High pass filtering module 430 can then determine luminance detail enhancement $Y_{detail}(p)$ for instance as the ratio of $Y_{base}(p)$ and $Y'_{base}(p)$:

$$Y_{detail}(p)=Y_{base}(p)/Y'_{base}(p) \qquad (24)$$

The different values of $Y_{detail}(p)$ over the digital image 112 then form a luminance detail enhancement map. Because $\sigma''_r>\sigma'_r$, this ratio corresponds to an extraction of high spatial frequencies of luminance values in the digital image 112, i.e. to a high pass filtering of this image. Other ways of extraction of high spatial frequencies of luminance values in the image and, more generally, of forming a luminance detail enhancement map $Y_{detail}(p)$ can be used without departing from the disclosure.

Expansion mapping module 440 can determine an expansion exponent map, $E(p)$, based on $Y_{base}(p)$ (Stage 340 of FIG. 3). Expansion exponent map, E, can be an image-sized floating point map, in which each value represents the exponent to be applied to $Y(p)$ of each pixel in original LDR image 112. The expansion exponent map can be for instance based on a quadratic function, such as:

$$E=a(Y_{base})^2+b(Y_{base})+c \qquad (2)$$

where the coefficients of the quadratic function, a, b, and c, can be parameters determined as follows based on a maximum display luminance, $L_{max}$, of the HDR display 130:

$$a=p_{a1}\exp(p_{a2}L_{max})+p_{a3}\exp(p_{a4}Lmax) \qquad (3)$$

$$b=p_{b1}L_{max}^{pb2}+p_{b3} \qquad (4)$$

$$c=1.3 \qquad (5)$$

The parameters used in the above equations can be set, for example, as follows: $p_{a1}=-8.192e-7$, $p_{a2}=0.000312$, $p_{a3}=1.657e-5$, $p_{a4}=-0.0006967$, $p_{b1}=0.05941$, $p_{b2}=0.03135$, and $p_{b3}=-0.07579$.

In this way, for example, the shape of the expansion exponent map E can change depending on the maximum display luminance, allowing for a global way of controlling the image appearance without requiring input from a user.

Other ways of determining an expansion exponent map $E(p)$ based on $Y_{base}(p)$ and/or $Y(p)$ can be used without departing from the invention. Such a map can be for instance determined separately for different luminance zones, such as a shadow zone, a midtone zone and a highlight zone. After having determined separately this map in these different luminance zones, any interpolation mean can be used to obtain the whole expansion exponent map from the maps specific to each luminance zone. Expansion exponent map $E(p)$ can be provided to inverse tone mapper module 450, where the luminance $Y(p)$ of each pixel p of the original LDR image 112 can be inverse tone mapped based on $E(p)$ into an expanded luminance $Y_{exp}(p)$. In various embodiments, $Y_{exp}(p)$ 237 can be the luminance of the pixel $Y(p)$ raised to the value of the expansion exponent $E(p)$.

As can be seen on FIG. 4B providing detailed view of the modules comprised in the inverse tone mapper module 450 of FIG. 4A, the inverse tone mapper module is where the denoising of the present disclosure is performed.

Since the expansion is done through an exponential function, noise and other artifacts in Y will inevitably be amplified. Although this issue is managed to some extend by using a low-filtered luminance $Y_{base}$ to compute expansion exponents E as shown above, in some case—particularly in the presence of film grain—the amplification is sufficiently strong that it impacts visual quality of the HDR image provided by the image processing 120. To avoid this, the luminance expansion step is adapted to perform a denoising effect based on an edge map which can be computed separately. It should be noted that this process should be optional and controllable as it is often likely to smooth areas where the artist would prefer to keep more detail.

The denoising approach described here aims to reduce the visibility of noise and grain without overly smoothing image details and edges. The key idea of this approach is that for each pixel p of the digital image 112, we can choose between expanding the luminance Y or the low-pass filtered luminance $Y_{base}$ of this pixel depending on the neighboring content around that pixel. By analyzing a block of pixels around p, we can determine whether this pixel belongs to a smooth area or if it's near an edge in this image 112. If the area is smooth, we can use the low-pass filtered luminance $Y_{base}$ as the input to the expansion of luminance with no loss of detail. On the other hand, if there is an edge nearby, we expand the unfiltered luminance Y to avoid smoothing the edge.

The edge mapping module 452 provides the first step of the denoising, the computation of the edge map M (Stage 350 of FIG. 3), which is obtained using a block-based analysis of the low pass filtered luminance, $Y_{base}$. This effectively can be seen as a simple edge detector and similar results could be achieved using a convolution with a Sobel filter or equivalent. Note however that after filtering, we take the magnitude of the response and ignore the sign.

For instance, for each pixel p in the low-pass version of the image $Y_{base}$, we consider a block $B_p$ of pixels around pixel p having for instance a size b×b. Within this block of pixels, we can compute an edge map in the digital image 112 as follows:

$$M(p) = \frac{1}{b^2} \sum_{k \in B_p} |Y_{base}(k) - Y_{base}(p)|$$

Note that, according to this formula, the analysis is preferably performed on the low pass filtered luminance layer $Y_{base}$ instead on the unfiltered luminance layer Y. The reason for that is that the low pass filtered luminance layer $Y_{base}$ is already filtered so that noise and grain should be mostly removed. As such, this edge detector will only respond to image details and edges that were strong enough to survive the Gaussian low pass filtering step described above (step 320). The value of M(p) will be higher if there is an edge within the block $B_p$ and lower if the block $B_p$ corresponds to a smooth area, which allows us to decide how to apply the expansion in the next step for instance as shown below. It means that the value M(p) related to a pixel p in the edge map is representative of edges and/or gradients around this pixel in the digital image 112, notably in a block centered on this pixel.

Figure 5A:
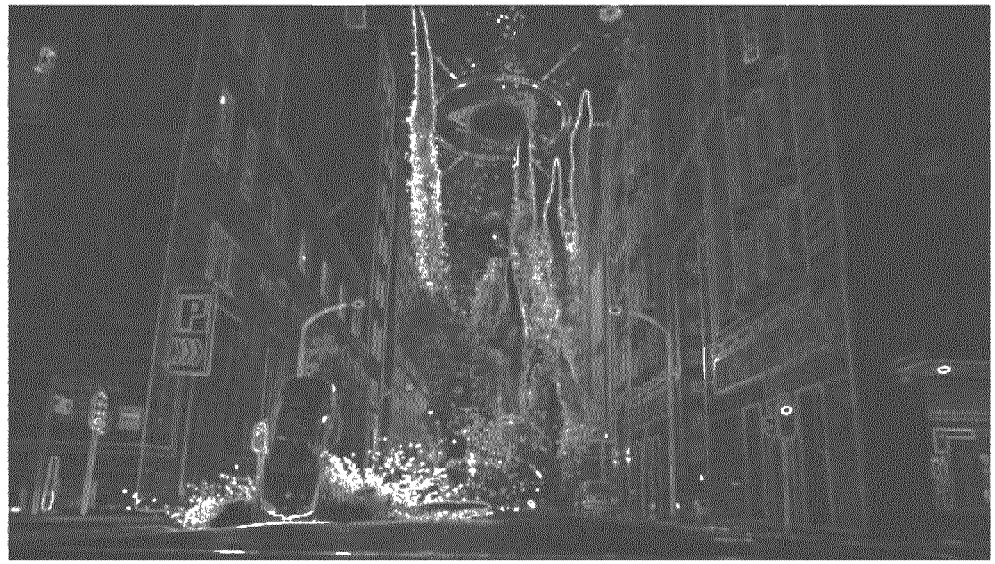
FIGS. 5A and 5B are screen shots showing the effect of using different block sizes for the noise filtering.
Figure 5B:

The size b of the blocks used to compute the edge map M(p) can serve as a parameter. Larger blocks will make the denoising more conservative as edges and detail further away will be counted, however they will also use more computational resources as more pixels are assessed for each block. FIG. 5A and 5B shows the effect of changing the block size. In FIG. 5A, the block size is b=5. In FIG. 5B, the block size is b=15.

Any other known edge detection algorithm can be used instead of the above equation used to compute the edge map. Such an edge map is considered as representative of edges and/or gradients around each pixel of the digital image 112.

After obtaining an edge map M(p) from the previous step, we can use this edge map to guide the inverse tone mapping of the luminance (stage 360 of FIG. 3) such as to remove some noise. Instead of applying the expansion exponent E(p) directly to luminance Y(p) of this pixel for any pixel p of the image 112, here, to get an expanded luminance $Y_{exp}(p)$ for any pixel p having an edge level M(p) above a threshold T, we apply the expansion exponent E(p) to a weighted combination of the image luminance Y(p) and of the low-pass filtered luminance $Y_{base}(p)$. In this weighted combination, the weight α of the low-pass filtered luminance $Y_{base}(p)$ for the pixel p is proportional to the value M(p) representative of edges and/or gradients around this pixel, and the weight (1-α) of the unfiltered luminance Y(p) for the same pixel p is inversely proportional to the same value M(p) representative of edges and/or gradients around this pixel. For instance, this combination is the following weighted sum:

$$Y_{exp}(p) = \begin{cases} Y(p)_p^{E(p)}, & M_p \geq \tau \\ (\alpha Y_{base}(p) + (1-\alpha)Y(p))^{E(p)}, & M_p < \tau \end{cases}$$

where α is preferably:

$$\alpha = \frac{M_p}{\tau},$$

where the threshold τ is for instance equal to 10.

A lower threshold will make the denoising more conservative in that it will only be applied to really smooth areas, while a higher threshold will allow the denoising to be applied more generally but it will also smooth image details more. See for example, the images in FIG. 6A and FIG. 6B.

The expanded luminance $Y_{exp}(p)$ can be provided to detail enhancement module 460. Detail enhancement module 460 can enhance the expanded luminance $Y_{exp}(p)$ of a pixel p by applying luminance detail enhancement $Y_{detail}(p)$ of this pixel. For example, an enhanced expanded luminance, $Y'_{exp}(p)$, can be determined based on the product of the expanded luminance and the luminance detail enhancement provided by the high pass filtering module 430, for example:

$$Y'_{exp}(p) = Y(p)^{E(p)} \times [Y_{detail}(p)]^d$$

where d is a detail enhancement parameter. This detail enhancement parameter d can control the amount of detail enhancement applied by the luminance detail map, $Y_{detail}(p)$. For example, increasing the value of d increases the contrast of image edges. In various embodiments, a value of d=1.5 can be used.

When expanding the luminance of the original LDR image as described above, luminance and contrast changes can affect the appearance of color and saturation in the image. In this regard, color information of the image may be adjusted by color saturation module 470. For example, color saturation module 470 can be used to preserve the artistic intent with respect to the color of the image. In various embodiments, saturations of colors can be enhanced using the expansion exponent values as a guide. More specifically, the saturation of the color of each pixel can be enhanced based on the zone expansion exponent map, E(p), of the pixel.

For example, saturation of the color of a pixel p can be enhanced by adjusting a Chroma value C(p) of the pixel. The Chroma value can be determined as follows in a cylindrical version of the YUV space:

$$C(p) = \sqrt{U(p)^2 + V(p)^2}$$

An adjusted Chroma value C'(p) can be determined as the product of zone expansion exponent map E(p) of the pixel p and the Chroma value C(p) of the pixel:

$$C'(p) = E(p) \times C(p)$$

In various embodiments, the Chroma scaling, which transforms C(p) into C'(p), can be limited to a factor of 1.5 to avoid over-saturating highlights, e.g., to avoid light explosions and bright lights.

With these new values of C'(p), enhanced values of chrominance, U'(p) and V'(p), 241 can be calculated by converting from a cylindrical color space, such as LCH here, to a YUV space:

$$U'(p) = \cos[H(p)] \times C'(p)$$

$$V'(p) = \sin[H(p)] \times C'(p)$$

where H(p) is the original hue computed from original U(p) and V(p) as follows:

$$H(p) = \arctan[V(p), U(p)]$$

A image recombiner module 480 can combine the enhanced values of chrominance U'(p) and V'(p) 241 with enhanced expanded luminance $Y'_{exp}(p)$ 239 to obtain and provide an expanded HDR image 122, i.e. a high dynamic version of the digital image 112.

Expanded HDR image 122 can be displayed on HDR display device 130. Of course, one skilled in the art would understand that expanded HDR image may require conversion into a color space of the display device, such as RGB, before being displayed. In the present embodiment that is handled by the RGB conversion module 490.

The combination of modules 460, 470, 480 490 provide an image with expanded dynamic range (Stage 370 of FIG. 3). As shown on FIG. 1, the expanded image 122 based on these expanded colors is now ready to be sent to the display device 130 having its peak luminance Lmax, in order to be reproduced within a high dynamic range. Example of such output using different threshold can be seen in FIG. 6A and FIG. 6B.

Figure 6A:
FIG. 6A and 6B are screen shots showing the showing the effect of different thresholds for noise filtering.
Figure 6B:

In the FIG. 6A, a threshold τ=50 was used to determine $Y_{exp}$, leading to reduced noise but also smoothing the details (e.g. the faces at the bottom of the image). In contrast, if a small threshold is used to determine $Y_{exp}$, as in FIG. 6B (τ=5), then both details and noise are more visible. In both cases however, the sharp edges between the sculpture and the background remain sharp.

While the present invention is described with respect to particular examples and preferred embodiments, it is understood that the present invention is not limited to these examples and embodiments. The present invention as claimed therefore includes variations from the particular examples and preferred embodiments described herein, as will be apparent to one of skill in the art. While some of the specific embodiments may be described and claimed separately, it is understood that the various features of embodiments described and claimed herein may be used in combination. Reference numerals appearing in the claims are by way of illustration only and shall have no limiting effect on the scope of the claims.

The invention claimed is:

1. A method for providing an expanded dynamic range image from a digital image defined by pixels associated with colors represented in a color space separating luminance from chrominance, comprising:
    inverse tone mapping luminance values of pixels of said image by applying, for each luminance value of a pixel, an expansion exponent value of said pixel:
        to a low-pass filtered luminance value of said luminance value if an edge/gradient value representative of edges and/or gradients in a block of pixels around said pixel is low such that the area of said block is smooth, or
        to said luminance value itself if the edge/gradient value representative of edges and/or gradients in a block of pixels around said pixel is higher than or equal to an edge/gradient threshold such that there is an edge within said block, or
        to a weighted combination of said luminance value and of a low-pass filtered luminance value of said luminance value for any other edge/gradient value if the edge/gradient value representative of edges and/or gradients in a block of pixels around said pixel is lower than said edge/gradient threshold, and,
    providing an expanded dynamic range image based on the inverse tone mapped luminance values,
    wherein the weight in said weighted combination is proportional to said edge/gradient value representative of edges and/or gradients in said block.

2. The method for providing an expanded dynamic range image according to claim 1, wherein said edge/gradient value representative of edges and/or gradients around said pixel is obtained by the application of an edge detector algorithm to pixels surrounding said pixel.

3. The method for providing an expanded dynamic range image according to claim 2, wherein said edge detector algorithm is applied to a low pass filtered luminance value of said surrounding pixels.

4. The method for providing an expanded dynamic range image according to claim 1, wherein said combination is a sum.

5. An apparatus for providing an expanded dynamic range image from a digital image defined by pixels associated with colors represented in a color space separating luminance from chrominance, comprising a processing unit configured to:
    inverse tone map luminance values of pixels of said image by notably applying, for each luminance value of a pixel, an expansion exponent value of said pixel:
        to a low-pass filtered luminance value of said luminance value if an edge/gradient value representative of edges and/or gradients in a block of pixels around said pixel is low such that the area of said block is smooth, or
        to said luminance value itself if the edge/gradient value representative of edges and/or gradients in a block of pixels around said pixel p is higher than or equal to an edge/gradient threshold such that there is an edge within said block, or
        to a weighted combination of said luminance value and of a low-pass filtered luminance value of said luminance value for any other edge/gradient value if the edge/gradient value representative of edges and/or gradients in a block of pixels around said pixel p is less than said edge/gradient threshold, and,
    provide an expanded dynamic range image based on the inverse tone mapped luminance values,
    wherein the weight in said weighted combination is proportional to said edge/gradient value representative of edges and/or gradients in said block.

6. The apparatus of claim 5, wherein the processing unit is further configured to obtain said edge/gradient value representative of edges and/or gradients around said pixel by the application of an edge detector algorithm to pixels surrounding said pixel.

7. The apparatus of claim 6, wherein said edge detector algorithm is applied to a low pass filtered luminance value of said surrounding pixels.

8. The apparatus of claim 5, wherein said combination is a sum.

9. A non-transitory computer-readable medium storing computer-executable instructions executable to provide an expanded dynamic range image from a digital image defined by pixels associated with colors represented in a color space separating luminance (Y) from chrominance, by:
    inverse tone mapping luminance values of pixels of said image by notably applying, for each luminance value of a pixel, an expansion exponent value of said pixel:
        to a low-pass filtered luminance value of said luminance value if an edge/gradient value representative of edges and/or gradients in a block of pixels around said pixel is low such that the area of said block is smooth, or
        to said luminance value itself if the edge/gradient value representative of edges and/or gradients in a block of pixels around said pixel is higher than or equal to an edge/gradient threshold such that there is an edge within said block, or
        to a weighted combination of said luminance value and of a low-pass filtered luminance value of said luminance value for any other edge/gradient value if the edge/gradient value representative of edges and/or gradients in a block of pixels around said pixel is less than said edge/gradient threshold, and,
    providing an expanded dynamic range image based on the inverse tone mapped luminance values,
    wherein the weight in said weighted combination is proportional to said edge/gradient value representative of edges and/or gradients in said block.

10. The non-transitory computer-readable medium of claim 9, wherein said edge/gradient value representative of edges and/or gradients around said pixel is obtained by the application of an edge detector algorithm to pixels surrounding said pixel.

11. The non-transitory computer-readable medium of claim 10, wherein said edge detector algorithm is applied to a low pass filtered luminance value of said surrounding pixels.

12. The non-transitory computer-readable medium of claim 9, wherein said combination is a sum.

* * * * *